United States Patent [19]
Chandler, Jr.

[11] 3,889,849
[45] June 17, 1975

[54] SHOT VOLUME AND CUSHION POINT CONTROL FOR INJECTION MOLDING APPARATUS

[75] Inventor: Robert F. Chandler, Jr., Roanoke, Va.

[73] Assignee: General Electric Company, Salem, Va.

[22] Filed: Dec. 26, 1973

[21] Appl. No.: 427,799

[52] U.S. Cl. .................................... 222/63; 425/145
[51] Int. Cl. ............................................... B29f 1/02
[58] Field of Search .......... 425/145, 167; 222/63, 1, 222/413

[56] References Cited
UNITED STATES PATENTS

| | | | |
|---|---|---|---|
| 3,436,443 | 4/1969 | Hutchinson | 425/145 X |
| 3,632,246 | 1/1972 | Ichikawa et al. | 222/413 UX |
| 3,647,309 | 3/1972 | Thompson | 425/145 X |
| 3,666,141 | 5/1972 | Ma et al. | 222/63 X |
| 3,693,946 | 9/1972 | Merritt | 425/145 X |
| 3,728,058 | 4/1973 | Wheeler | 222/413 UX |
| 3,797,808 | 3/1974 | Ma et al. | 222/63 |

Primary Examiner—Robert B. Reeves
Assistant Examiner—David A. Scherbel
Attorney, Agent, or Firm—Walter C. Bernkopf; James H. Beusse

[57] ABSTRACT

A simplified process controller for effecting the continued operation of an injection molding machine in a predetermined mode. A timer is started when the injection ram begins an injection stroke. When a first predetermined time has elapsed, it is assumed that the initial cushion point has been reached and the ram injection pressure is reduced to a holding value. At a subsequent time a comparison is made between a signal representing an actual final ram cushion point position, and another signal representing the desired position. An error signal is then generated and utilized to change the screwback and pullback positions of the ram. Simultaneous modification of the screwback and pullback points maintains a constant shot volume for each injection stroke.

In another embodiment the transition from injection to holding pressure is accomplished as a function of ram position rather than time. The error signal is then also utilized to control the point at which the pressure change occurs.

13 Claims, 2 Drawing Figures

SHOT VOLUME AND CUSHION POINT CONTROL FOR INJECTION MOLDING APPARATUS

BACKGROUND OF THE INVENTION

The present invention relates to plastic molding machinery, and more particularly to apparatus for controlling the activity of injection molding apparatus.

Although the injection molding principle has long been known and apparatus for practicing injection molding widely used, it has been only recently that sophisticated controls have been developed for automatically monitoring and correcting the activity of injection molding apparatus. Previously the adjustment and control of an injection molding machine was a tedious, artful process which relied to a great extent upon trial and error and upon the skill and experience of the individual operating the machinery. While there are several reasons which may be advanced to explain this situation, perhaps the most salient reason is the multiplicity of variables which are involved in the operation of an injection molding device.

The basic operation of a typical injection molding apparatus is straightforward. A ram having a spiral thread formed thereon is disposed within a barrel having an elongate cavity, at the end of which is a mold to be filled by the injection process. A quantity of plastic material, which may be in pelletized or granulated form, is introduced at the rearward end of the ram and the ram rotated to masticate and thus plasticize the particulate material, forcing it forwardly upon the spiral ram flights and compressing it in the forward end of the barrel. The working and compression of the plastic material, along with heat which is ordinarily applied to the external surface of the barrel, serves to heat the plastic material to a fluid state. As more material is forced into the area ahead of the ram, the ram is necessarily pushed backward until enough plasticized material is accumulated ahead of the ram to fill the mold. At this time rotation of the ram ceases, and the ram may be pulled back further to relieve the pressure upon the accumulated plastic material or "shot". To effect injection molding the ram is forced forward, commonly through the mechanism of a hydraulic piston. The shot is then injected under great pressure into the mold, the ram continuing to advance until the mold is filled. At this point, advancement of the ram ceases and after solidification the finished part is withdrawn from the mold. At this time the ram may again commence rotation in order to introduce another shot of plasticized material into the barrel.

While the foregoing operation is straightfoward and conceptually simple, control of the process is more of an art than a science due to the many variables involved. The fluidity of the plasticized material may be varied by changing the temperature of the injection mold barrel. It may also be operated upon by changing the pressure applied to the ram during the plasticization process, and/or the speed or rotation of the ram. Besides this, the velocity at which the ram is advanced during the injection process must be carefully controlled, and it may be even desirable to vary the ram velocity during the injection stroke. The total length of the stroke, the amount of retreat achieved through rotation (screwback) and translation (pullback), and the point of stroke termination within the barrel are also variables which may be adjusted either independently or in concert with one another. In addition to the foregoing, the pressure applied to the ram must be varied at different stages of the process.

With increasing attention being given to controls for injection molding machines, many approaches have been devised for monitoring and controlling various combinations of the above-noted variables. For example, in U.S. patent application Ser. No. 194,129—Wheeler, filed Nov. 1, 1971 and assigned to the assignee of the present invention, there is set forth a sophisticated process control system which controls several of the afore-noted variables as a function of the viscosity of the plasticized material.

One important criterion used in several modern-day controls relates to the filling or packing of the mold. It will be appreciated that as the ram advances and the mold fills, the pressure of the plasticized material will undergo a sudden rise. At the same time, due to the relative incompressibility of the plasticized material, there is a corresponding decrease in ram velocity. If injection pressure is thereafter maintained upon the ram the mold will be overfilled with the result that the mold will "flash," a phenomenon which results from plasticized material being forced into interstices between the segments of a mold. In order to avoid this problem, several solutions have been suggested. For example, with one approach mold pressure is monitored and when it exceeds a predetermined peak value it is assumed that the mold is filled; the pressure on the ram is then reduced to a lower holding pressure. Another approach is to monitor the rate of change of shot pressure, and when the rate of change of pressure rises it is assumed that mold filling or packing has taken place. These two approaches may be implemented by monitoring the pressure of the plasticized material in the mold, the pressure of the shot within the barrel of the injection apparatus, or the pressure of the hydraulic fluid forcing the ram ahead. While each approach has its adherents, to date no one version is demonstrably superior and the merit of any given approach is open to debate.

Still another approach has been taken in which the velocity of the ram is monitored and either the velocity, or the rate of change of velocity, utilized to indicating the packing point. As before, when the packing point is achieved pressure is reduced to a suitable holding value to allow curing of the part in the mold without flashing. Another, more prevalent method of control implements the change from injection to holding pressure after a predetermined period of time has elapsed, irrespective of ram position.

It will be seen that most of the foregoing approaches to injection molding control rely upon closely monitoring a suddenly-changing variable. Further, to provide the requisite signals representing the rate of change of pressure or velocity it is usually necessary to process the signals by a differentiation circuit. It will therefore be appreciated that it would be useful to provide an improved control system for an injection molding machine which relies upon only a single, easily measured variable.

It is therefore an object of the present invention to provide an improved, simplified control for an injection molding apparatus.

It is another object of this invention to provide self-correction control circuitry for an injection molding apparatus, which does not rely upon the sensing of time-related mold packing characteristics.

Still another object is to provide a plastic molding control system having self-correcting action based upon final ram position.

SUMMARY OF THE INVENTION

Briefly stated, in accordance with one aspect of the invention the foregoing objects are achieved by providing means for indicating the position of the ram of an injection molding apparatus. As the ram commences advancement, a timer is started and at the end of a predetermined time a position error signal is sampled by an error integrate and hold circuit. At the same time, the position signal is applied to means for controlling the screwback and pullback positions of the ram. A signal representing the accrued, position error signals is also applied to the screwback and pullback position control means and a correction signal representative of the difference between the accumulated error signals and the ram position signal used to determine the final, screwback and pullback positions of the ram.

In a further embodiment, additional control means are provided for effecting a change from injection to holding pressure as a function of the position signal and the accumulated error signal.

BRIEF DESCRIPTION OF THE DRAWINGS

While the specification concludes with claims particularly pointing out and distinctly claiming the subject matter which is regarded as the invention, it is believed that the invention will be better understood from the following description of the preferred embodiment taken in conjunction with the accompanying drawing in which:

DESCRIPTION OF A PREFERRED EMBODIMENT

Figure 1:
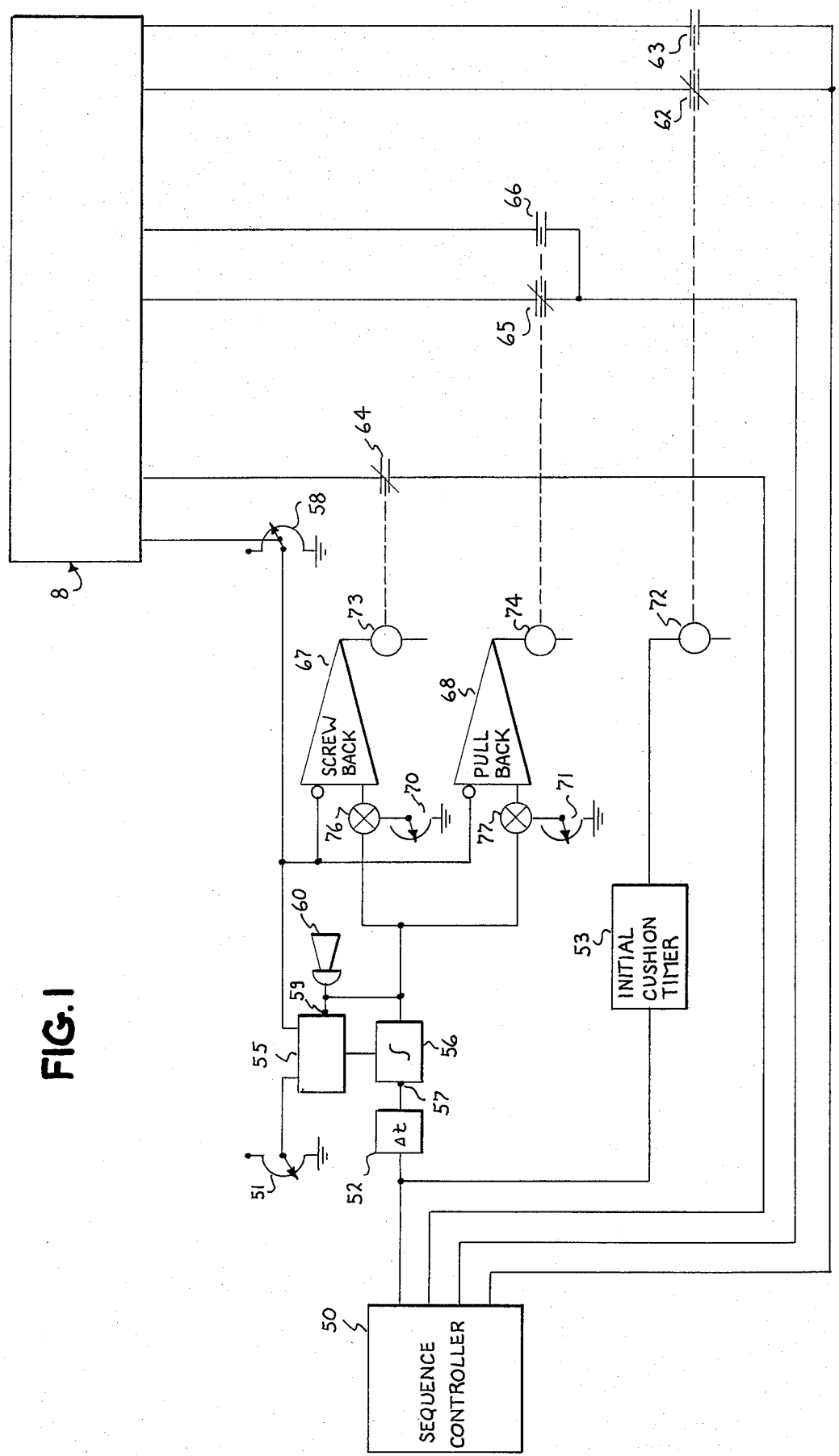
FIG. 1 illustrates in schematic form an injection molding control system utilizing principles of the present invention.

FIG. 1 illustrates, in idealized form a control system for an injection molding apparatus 8 of a type suitable for the injection molding of plastic materials. Such an injection molding apparatus is shown in detail in FIG. 2 and comprises a ram 10 is translatably disposed within a barrel 12 having a nozzle portion 14 at one end thereof. A hopper 16 is in communication with the interior of barrel 12 and serves as a reservoir for material to be plasticized. A segmented mold 18 is coupled to the nozzle 14 of the apparatus and comprises a suitably-formed chamber for receiving plasticized material from within barrel 12 by way of appropriate orifices and channels therein.

As is well understood by those skilled in the art, the ram 10 is provided with a series of flights 20 disposed helically thereabout so that upon rotation of the ram particulated material from hopper 16 is urged forwardly to the end of ram 10. The work done on the particulated material and the pressure exerted thereupon creates heat which, in addition to the heat applied to barrel 12 from an external source such as an electrical resistive heater, produces a reservoir of plasticized material in front of the ram. This reservoir increases in volume as the ram turns, thus effecting the retreat or "screwback" of the ram itself. The volume of plasticized material thus accrued, termed a shot, is subsequently forced into the mold 18 by the advancement of the ram.

In order to achieve rotation of the ram a drive mechanism such as motor 22 operates through a set of gears 24, 26 to turn the shaft 28 coupled to ram 10. Translation of the ram is effected by hydraulic means which advantageously comprise a hydraulic cylinder 30 having a piston 32 therein. A first chamber 34 within cylinder 30 receives pressurized fluid from a pump 36 through valve 38 for causing the leftward translation (advancement) of piston 32. Additional control over hydraulic pressure is provided by means of a controllable relief valve 40. The non-rotational retreat or pullback of ram 10 is effected by introducing pressurized hydraulic fluid into a second chamber 42 of hydraulic cylinder 30. A second hydraulic pump 44 and associated valve 46 are used to accomplish this, advantageously in connection with a second controlled relief valve 48.

Figure 2:
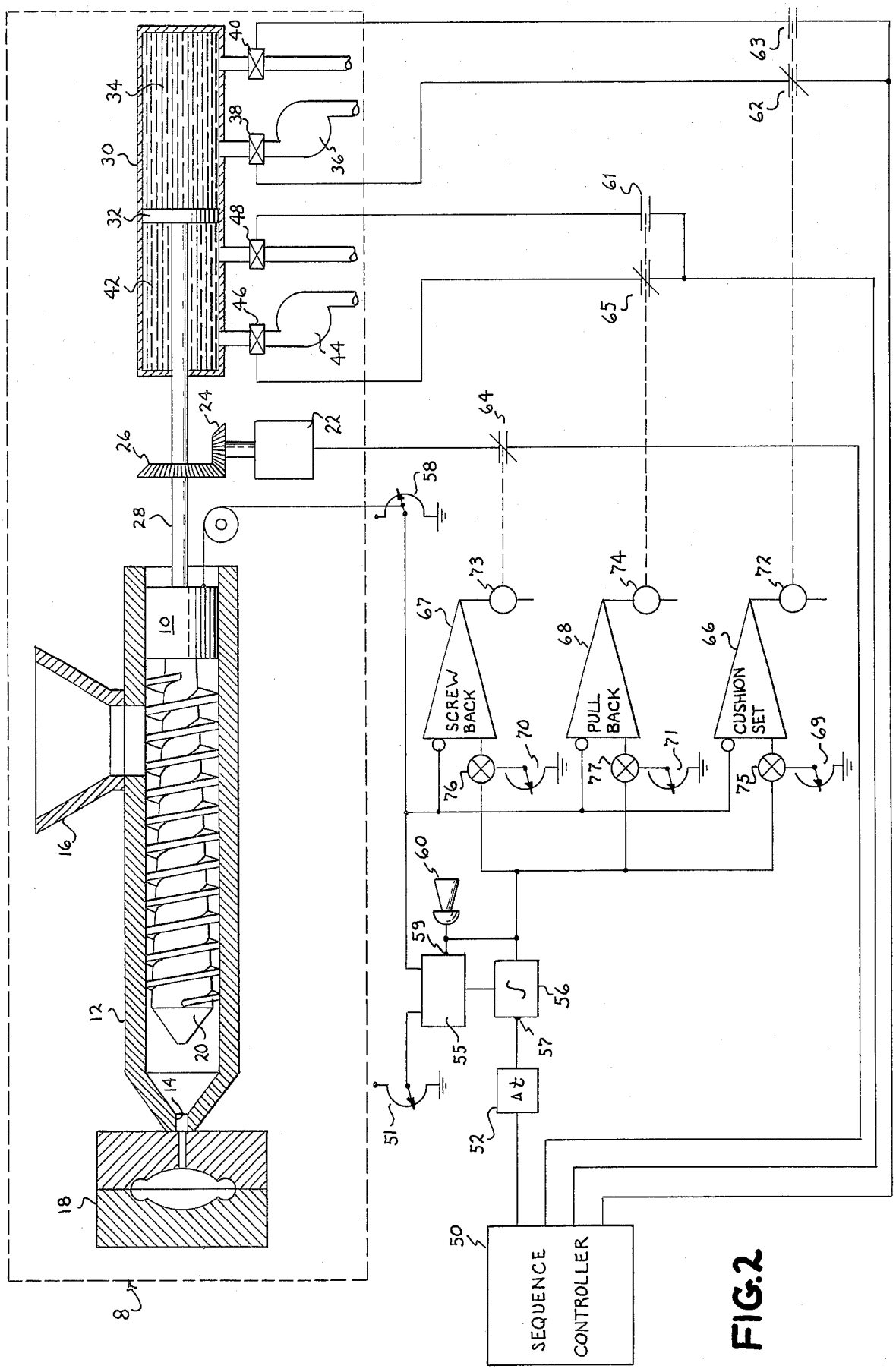
FIG. 2 shows an injection molding control system constructed in accordance with another embodiment of the invention.

Referring now to FIG. 1, there is shown one embodiment of a control system according to the present invention wherein control signals applied to the block identified as injection molding apparatus 8 are applied to corresponding elements shown in injection molding apparatus in FIG. 2. In order to automatically or semi-automatically operate the above-described injection molding apparatus a sequence controller 50 is provided. Sequence controller 50 represents any one of the many types which have long been commercially available. As controller 50 does not comprise part of the present invention it will not be described in detail save to say that it applies electrical signals to the controlling apparatus for effecting operation of the injection molding apparatus at timed intervals and in a predetermined sequence.

A "start" signal from the sequence controller is applied by means of time delay 52 to enable terminal 57 of an integrate-and-hold circuit 56. A final cushion point reference signal from potentiometer 51 is coupled to one input of a comparison circuit 55. Comparison circuit 55 also receives an input signal from a position control transducer, here shown as a cable operated potentiometer 58, and applies a position error signal representative of the difference between the received signals to integrate-and-hold circuit 56. Comparison circuit 55 and integrate-and-hold circuit 56 are further connected to an alarm 60.

Integrate-and-hold circuit 56 may be any one of the many types familiar to those skilled in the art. When an appropriate signal is applied to enable terminal 57 the circuit commences to combine a received error signal with a previously-accrued signal which has been memorized or held by suitable means. In an analog-type circuit such means might comprise a low leakage capacitor. After termination of the enable signal the output of integrate-and-hold circuit 56 then reflects the algebraic sum of previously received error signals, which may alternatively be considered as a time-averaged or integrated signal level. In practice it has been found useful to accrue only a portion of an error signal during each enablement in order to avoid overcorrection.

The signal applied to time delay 52 is also coupled to a second timer 53, and by means of normally-closed relay contacts 62 to a control valve 38 for hydraulic pump 36 which is operative to advance ram 10 by applying pressure to piston 32. Upon closure of normally-open contacts 63 the signal is also coupled to a relief valve 40 for hydraulic chamber 34. Another signal produced by controller 50 is coupled by means of normally-closed relay contacts 64 to motor 22 for effecting the screwback retreat of ram 10, while a further signal is applied through normally-closed relay contacts 65 to valve 46 of a hydraulic pump 44 which is operative to effect the pullback retreat of the ram.

The position signal reflecting the location of ram 10 which is produced by potentiometer 58 is applied to comparators 67 and 68 while the integrated, sampled error signal from integrate-and-hold circuit 56 is applied to the remaining input terminals of each comparator. Potentiometers 70 and 71 are coupled to appropriate summing junctions 76 and 77 for applying appropriate signal biases to the input terminals of comparators 67 and 68, respectively.

In operation, sequence controller 50 applies a "start" signal to first and second time delays 52 and 53, and to valve 38 by way of normally-closed relay contacts 62. Pump 36 is then caused to force hydraulic fluid into cavity 34 causing piston 32, and thus ram 10, to advance within barrel 12. The leftward translation of ram 10 forces plasticized material previously accumulated ahead of the ram through nozzle 14 and into mold 18. As ram 10 advances, the adjustment of position indication potentiometer 58 changes accordingly so that a voltage indicative of ram position is applied to error signal comparator 55 and to the inverting inputs of comparators 67 and 68.

After a predetermined time has passed, timer 52 times out and applies an enabling signal of a predetermined duration to the enabling terminal 57 of circuit 56 allowing an error signal produced by comparison circuit 55 to be accumulated by integrate-and-hold circuit 56. Comparison circuit 55 produces an error signal representative of the difference between that signal derived from potentiometer 58, and a reference signal from potentiometer 51. Integrate-and-hold circuit 56 then acts to algebraically add a predetermined portion of the error signal to a previously-sampled signal, and to produce an error signal representative of the new, indicated error.

If the sampled signal is indicative of advancement of ram 10 past some predetermined minimum point it is assumed that mold 18 is filled. As is known in the injection molding art, when mold 18 begins to fill the resistance to forward advancement of ram 10 increases rapidly, and the velocity of the ram drops precipitantly. As the mold becomes completely filled, forward motion of the ram ceases. If the high pressure used for the injection stroke is maintained upon piston 32, the plasticized material in mold 18 will be forced into the interstices between the mold halves and cause flashing of the finished part.

In order to avoid this effect, it is known to provide means to lower the injection pressure to a value termed the "holding pressure" which maintains a suitable compacting pressure upon the plasticized material in the mold, but is inadequate to cause the above-mentioned flashing. In the present system this function is accomplished by means of initial cushion timer 53, and a relay comprising a winding 72 which opens normally-closed contacts 62 and closed normally-open contacts 63. When a predetermined period of time has elapsed after initiation of ram advancement it is assumed that the initial cushion point has been attained and timer 53 applies a signal to relay winding 72 causing the pressure applied to ram 10 to drop from an injection pressure to a lower, holding pressure. As referred to herein the initial cushion point designates that point in the injection process at which mold pressure rises, and ram velocity drops, in a sudden manner.

The present invention also contemplates that the filling or packing of the mold will be accomplished within a certain predetermined time, whose duration is reflected in the activity of time delay 52. After timer 52 has timed out, it is assumed that the ram has achieved its final position and the system has reached a quiescent state at which time integrate-and-hold circuit 56 may be energized to sample ram position error.

Integrate-and-hold circuit 56 then produces an error signal indicative of the final ram position, said signal being applied by way of the appropriate summing junctions to comparators 67 and 68. Potentiometers 70 and 71 are adjusted to provide a predetermined bias level which determines the ram position at which each comparator will normally effect the operation of a designated function. The integrated sampled signal provided by integrate-and-hold circuit 56 is applied along with the output of potentiometer 70 by way of a summing junction 76 to one input of comparator 67. The other input is received from position potentiometer 58. The difference in the signals determines when screwback comparator 67 will actuate relay winding 73 during the following cycle to cause an opening of relay contact 64, and thus the termination of the screwback operation. By varying the point of termination of the screwback operation, it will be understood that the amount of plasticized material accumulated within barrel 12 may be varied to correspond with changes in the stroke termination or final cushion point. In this manner a constant shot size is achieved by causing the screwback termination point to track changes in the final cushion point.

It will be seen that a position signal from potentiometer 58 is also applied to one input of pullback comparator 68, the other input terminal receiving the summed total of the signals from integrate-and-hold circuit 56, and adjusting potentiometer 71. Deviation of the sampled final cushion point signal from some predetermined value will cause pullback comparator 68 to produce an output signal in response to a corresponding different position signal level during the next cycle and so effect change in the point of ram position at which contacts 65 and 61 are operated. When closed, contact 65 allows a signal to be applied to valve 46 for causing hydraulic pump 44 to apply pressure to the leftward side of piston 32, causing ram 10 to retreat. When operated by a signal from pullback comparator 68, contact 65 opens to effect a closing of valve 46 while contacts 61 close to open bypass valve 48. The combined closure of valve 46 and opening of valve 48 lower the pressure in chamber 42 and thus cause the retreat of ram 10 to cease. This retreat, termed "pullback", occurs after the termination of the screwback operation and serves to relieve the pressure exerted by the ram upon the plasticized material accumulated within barrel 12. By applying the sampled error signal to pullback comparator 68, the point in the ram stroke at which pullback comparator 68 terminates the pullback operation is varied in accordance with the change in termination point of ram advancement effected by initial cushion timer 53.

Referring now to FIG. 2, there is shown a system similar to that disclosed in FIG. 1 hereinabove, modified in accordance with a further embodiment of the present invention. A third comparator 66 replaces the initial cushion timer 53 shown in FIG. 1, and serves to actuate relay contact 62 and 63 through energization of winding 72.

One input terminal of comparator 66, hereinafter referred to as an initial cushion comparator, receives a ram position signal from potentiometer 58. The other input of the initial cushion comparator receives a reference signal from summing junction 75. The signal arising at junction 75 is derived from an adjustable reference potentiometer 69, and from an accrued sampled error signal supplied by integrate-and-hold circuit 56.

In operation, initial cushion comparator 66 is energized when the position signal received from potentiometer 58 obtains a predetermined relationship with the reference signal, including the sampled error signal, derived from summing-junction 75. Thus, when the ram attains a position determined by the adjustment of potentiometer 69, and a sampled error signal, coil 72 is energized to cause normally-closed contact 62 to open, and contact 63 to close. This effectively lowers the hydraulic pressure in chamber 34 by diminishing the flow of hydraulic fluid available from pump 36 by modifying the setting of valve 38, and by opening relief valve 40. The net effect is to lower the previous injection pressure applied through piston 32 to ram 10 to a suitable holding pressure.

By suitable adjustment of potentiometer 69 the point at which the initial cushion comparator 66 is activated may be controlled as a function of the final cushion position of ram 10. The point at which the change from injection to holding pressure occurs may therefore be related to the terminal ram position (final cushion point). The relationship of the initial cushion point to the final cushion point is maintained through the feedback error signals supplied by the integrate-and-hold circuit 56. As set forth above, the error signal also modifies the position at which screwback and pullback occur, thus maintaining the constant shot volume in the presence of correction in ram position.

It will now be appreciated that the control system described herein monitors final ram position after the expiration of a fixed period of time, regardless of transient pressure or velocity chatacteristics and institutes holding pressure as a function of ram position. While it is recognized that, generally speaking, a marked decrease in velocity and an increase in pressure occur when ram 10 achieves filling of the mold, it has been found that a reduction in ram pressure at this point may be instituted as a function of ram position. This avoids the necessity for monitoring a suddenly-changing variable such as pressure or velocity. Were pressure utilized as a control parameter, a temporary blockage in nozzle 14, creating a transient pressure rise, might trigger the pressure responsive mechanism and falsely indicate complete packing of the mold. Conversely, were velocity of the ram to be taken as the measure of mold filling a temporary sticking or deceleration of the ram due to irregularities in the hydraulic system, improper operation of the hydraulic valve, or excessive friction within barrel 12 would generate a signal erroneously indicating complete filling of the mold.

By allowing sufficient time to pass for a nozzle blockage to clear and temporary sticking of the ram to be overcome the present system assures that the position error signal sampled by integrate-and-hold circuit 56 will represent the true termination point of the ram stroke. Therefore, the signal applied by circuit 56 to comparators 66, 67 and 68 will reflect only actual errors in ram position and not mere transient phenomena. However, it must be recognized that occasional irregularities in machine operation may still result.

For this reason, should a failure occur such that the ram has not advanced past some predetermined minimum position when timer 52 times out, the accrual of an unusually large error signal by comparison circuit 55 or integrate-and-hold circuit 56 will disable the circuit and energize alarm 60. This activity will prevent the creation of an inordinately larger error signal by the various comparators and alert an operator to the failure of the machine. Similarly, to avoid the bottoming of ram 10 within barrel 12 due to the undue advancement of the ram, should the position signal produced by potentiometer 58 reflect undue advancement a minimum error signal will be produced by circuit 56 for effecting a correcting retraction of the ram.

It has been found feasible in practicing the invention to adjust the control system elements so that an error signal is produced which is only about one-fourth that theoretically required to return the ram cushion position to its desired location. In this manner, frequent drastic correction of ram position is obviated and the chances of ram position oscillating about a desired point are minimized. Rather, the ram will be caused to gradually achieve a desired position by adjusting it in ever-smaller increments.

As will be evident from the foregoing description, certain aspects of the invention are not limited to the particular details of the examples illustrated, and it is therefore contemplated that other modifications or applications will occur to those skilled in the art. It is accordingly intended that the appended claims shall cover all such modifications and applications as do not depart from the true spirit and scope of the invention.

What is claimed as new and desired to be secured by Letters Patent of the United States is:

1. A control system for an injection molding machine including a ram and having drive means for rotating, and hydraulic means for advancing and withdrawing said ram, said control system comprising:
   position sensing means for producing a position signal indicative of ram position;
   reference means for producing a first position reference signal;
   circuit means connected to receive said position signal and said reference signal for producing an error signal representing the difference therebetween;
   first control means for causing pressure applied by said hydraulic means upon said ram to decline from a first, higher value to a second, lower value;
   second control means responsive to said error signal for establishing a point for termination of operation of said drive means; and
   third control means responsive to said error signal for establishing a point of maximum withdrawal of said ram.

2. The invention defined in claim 1, wherein said first control means comprises a timer for effecting a decline in said applied pressure a predetermined time after initiation of ram advancement.

3. The invention defined in claim 2, wherein said second control means comprises a comparison circuit coupled to said circuit means and to said position sensing means and operative to terminate the screwback operation in response to the achievement by said ram position signal of a predetermined relationship with a second reference signal comprising said error signal.

4. The invention defined in claim 3, wherein said third control means comprises a comparison circuit coupled to said circuit means and to said position sensing means and operative to terminate the pullback of said ram in response to the achievement by said ram position signal of a predetermined relationship with a third reference signal comprising said error signal.

5. The invention defined in claim 1, wherein said first control means comprises a comparison circuit coupled to said circuit means and to said position sensing means and operative to reduce said hydraulic pressure upon said ram from a first, higher value to a second, lower value in response to the achievement by said ram position signal of a predetermined relationship with a third reference signal comprising said error signal.

6. The invention defined in claim 5, wherein said second control means comprises a comparison circuit coupled to said circuit means and to said position sensing means and operative to terminate the screwback operation in response to the achievement by said ram position signal of a predetermined relationship with a second reference signal comprising said error signal.

7. The invention defined in claim 6, wherein said third control means comprises a comparison circuit operative to terminate the pullback of said ram in response to the achievement by said ram position signal of a predetermined relationship with a third referenced signal.

8. A control system for controlling the operation of an injection molding machine including a ram and having drive means for rotating, and hydraulic means for advancing and withdrawing said ram comprising;

position sensing means for producing a signal indicative of ram position;

reference means for producing a first reference signal representative of a desired final ram position;

comparison means coupled to said position sensing means and said reference means for producing a ram position error signal;

an integrate-and-hold circuit coupled to said comparison means for periodically receiving a signal representative of ram position error and outputting a signal representative of accrued position error;

first timer means for periodically energizing said integrate-and-hold circuit;

first control means for causing pressure exerted by said ram to decline from a first, higher value to a second, lower value;

second control means coupled to said integrate-and-hold circuit for terminating the operation of said drive means in response to a signal outputted by said integrate-and-hold circuit; and third control means coupled to said integrate-and-hold circuit for establishing a point of maximum withdrawal of said ram in response to a signal outputted by said integrate-and-hold circuit.

9. The invention defined in claim 8, wherein said final ram position comprises a final cushion point.

10. The invention defined in claim 9, wherein said first control means comprises second timer means for effecting a decline in said applied pressure a predetermined time after initiation of ram advancement.

11. The invention defined in claim 9, wherein said first control means comprises a comparison circuit coupled to said integrate-and-hold circuit for establishing a point at which pressure exerted by said ram is reduced from a first, higher value to a second, lower value.

12. The invention defined in claim 11, wherein said first, second, and third control means comprise comparison circuits, each of said comparison circuits having a first input coupled to said position sensing means and a second input coupled to said integrate-and-hold circuit.

13. The invention defined in claim 12, further including first, second, and third summing means coupled to the second inputs of said first, second and third control means respectively for combining the signal outputted by said integrate-and-hold circuit and first, second, and third reference signals.

* * * * *